United States Patent
Gray et al.

(10) Patent No.: US 10,887,785 B1
(45) Date of Patent: Jan. 5, 2021

(54) WIRELESS MESH FABRIC FOR HARDWARE RESOURCE DISCOVERY AND MANAGEMENT

(71) Applicant: Open Drives LLC, Culver City, CA (US)

(72) Inventors: Scot Gray, Culver City, CA (US); Sean Lee, Culver City, CA (US)

(73) Assignee: Open Drives LLC, Culver City, CA (US)

( * ) Notice: Subject to any disclaimer, the term of this patent is extended or adjusted under 35 U.S.C. 154(b) by 0 days.

(21) Appl. No.: 17/017,159

(22) Filed: Sep. 10, 2020

(51) Int. Cl.
| | |
|---|---|
| G06F 3/06 | (2006.01) |
| G06F 11/32 | (2006.01) |
| G06F 12/00 | (2006.01) |
| H04L 12/751 | (2013.01) |
| H04W 24/00 | (2009.01) |
| H04W 84/18 | (2009.01) |
| H04W 28/02 | (2009.01) |
| H04W 28/08 | (2009.01) |

(52) U.S. Cl.
CPC ..... *H04W 28/021* (2013.01); *H04W 28/0231* (2013.01); *H04W 28/0819* (2020.05); *H04W 84/18* (2013.01)

(58) Field of Classification Search
CPC .......... H04W 28/021; H04W 28/0231; H04W 84/18; H04W 28/0819; H04W 24/02; H04W 4/80; H04W 24/04; G06F 11/325; G06F 11/326; G06F 11/3034; G06F 3/0605; G06F 3/0653; G06F 3/0683; H04L 41/04; H04L 41/06; H04L 41/0604; H04L 41/0677; H04L 41/069; H04L 41/12; H04B 3/46; H04B 17/19; H04B 17/29

See application file for complete search history.

(56) References Cited

U.S. PATENT DOCUMENTS

| | | | | |
|---|---|---|---|---|
| 4,857,918 A | * | 8/1989 | Nukushina | G05D 23/19 340/870.01 |
| 7,302,593 B2 | * | 11/2007 | Rothman | G01S 5/14 713/300 |
| 8,140,717 B2 | * | 3/2012 | Eide | G06F 9/45558 710/15 |
| 9,148,349 B1 | * | 9/2015 | Burr | G06F 3/0605 |
| 9,514,846 B2 | * | 12/2016 | Hsieh | G11C 5/04 |

(Continued)

*Primary Examiner* — Ahmed Elallam
(74) *Attorney, Agent, or Firm* — Ansari Katiraei LLP; Arman Katiraei; Sadiq Ansari

(57) ABSTRACT

Provided are systems and methods for wirelessly managing hardware resources that are distributed across different storage apparatus in a site. The systems and methods may include broadcasting a unique identifier from different controllers that operate as part of the different storage apparatus, mapping a physical position of the different controllers based on one or more of a different time or order with which each controller receives the unique identifier of another controller, monitoring a data network that is used to access the hardware resources installed in a particular storage apparatus, determining status of the hardware resources, and controlling visual indicators of a particular controller, that operates as part of the particular storage apparatus, so that each visual indicator conveys the status of a different hardware resource that is aligned or otherwise associated with one of the visual indicators.

16 Claims, 12 Drawing Sheets

(56) References Cited

U.S. PATENT DOCUMENTS

| | | | |
|---|---|---|---|
| 10,355,938 B2* | 7/2019 | Saha | H04W 4/80 |
| 10,572,362 B2* | 2/2020 | Klein | G06F 11/327 |
| 2005/0138439 A1* | 6/2005 | Rothman | G01S 5/14 |
| | | | 713/300 |
| 2007/0095907 A1* | 5/2007 | Robinson | G06Q 10/087 |
| | | | 235/385 |
| 2019/0187909 A1* | 6/2019 | Pinto | G06F 3/0605 |

\* cited by examiner

WIRELESS MESH FABRIC FOR HARDWARE RESOURCE DISCOVERY AND MANAGEMENT

BACKGROUND

Data centers are examples of sites that may contain many network accessible hardware resources. The network accessible hardware resources may be installed in slots of different racks or chassis, and the racks or chassis may be distributed throughout a site. As a result, the site may house homogenous rows of racks that each contain several different but homogenous looking hardware resources.

Before each particular hardware resource becomes accessible, a user may need to move to the installed location of that particular hardware resource, directly connect to that particular hardware resource, and configure that particular hardware resource to communicate on a data network. Due to the similarity in appearance and number of hardware resources that are located next to one another, configuration errors are not uncommon and can be difficult to diagnose.

Similarly, maintenance and/or any other modifications to the hardware resources may be difficult to implement once the hardware resources are deployed and running in the site. In particular, locating a failing hardware resource amongst rows of racks that contain a plurality of homogenous looking devices may become a time-consuming task. Moreover, modification of the incorrect hardware resource can lead to a cascade of other errors that become increasingly more difficult to diagnose and correct.

DETAILED DESCRIPTION OF PREFERRED EMBODIMENTS

The following detailed description refers to the accompanying drawings. The same reference numbers in different drawings may identify the same or similar elements.

Provided are systems and methods for wirelessly managing a plurality of hardware resources that are distributed across different storage apparatus (e.g., racks, chassis, etc.) of a site. The systems and methods may include creating a radio frequency ("RF") mesh network using a set of controllers that operate from each storage apparatus. The systems and methods may further include using the RF mesh network and/or messaging between the controllers to automatically discover the plurality of hardware resources that are installed in each storage apparatus, generate a mapping of the storage apparatus locations in the site, provide diagnostic information via independent and collective control of visual indicators associated with the different hardware resource, and/or remotely modify each hardware resource without a user being directly connected to that hardware resource or the hardware resource being network accessible.

Figure 1:
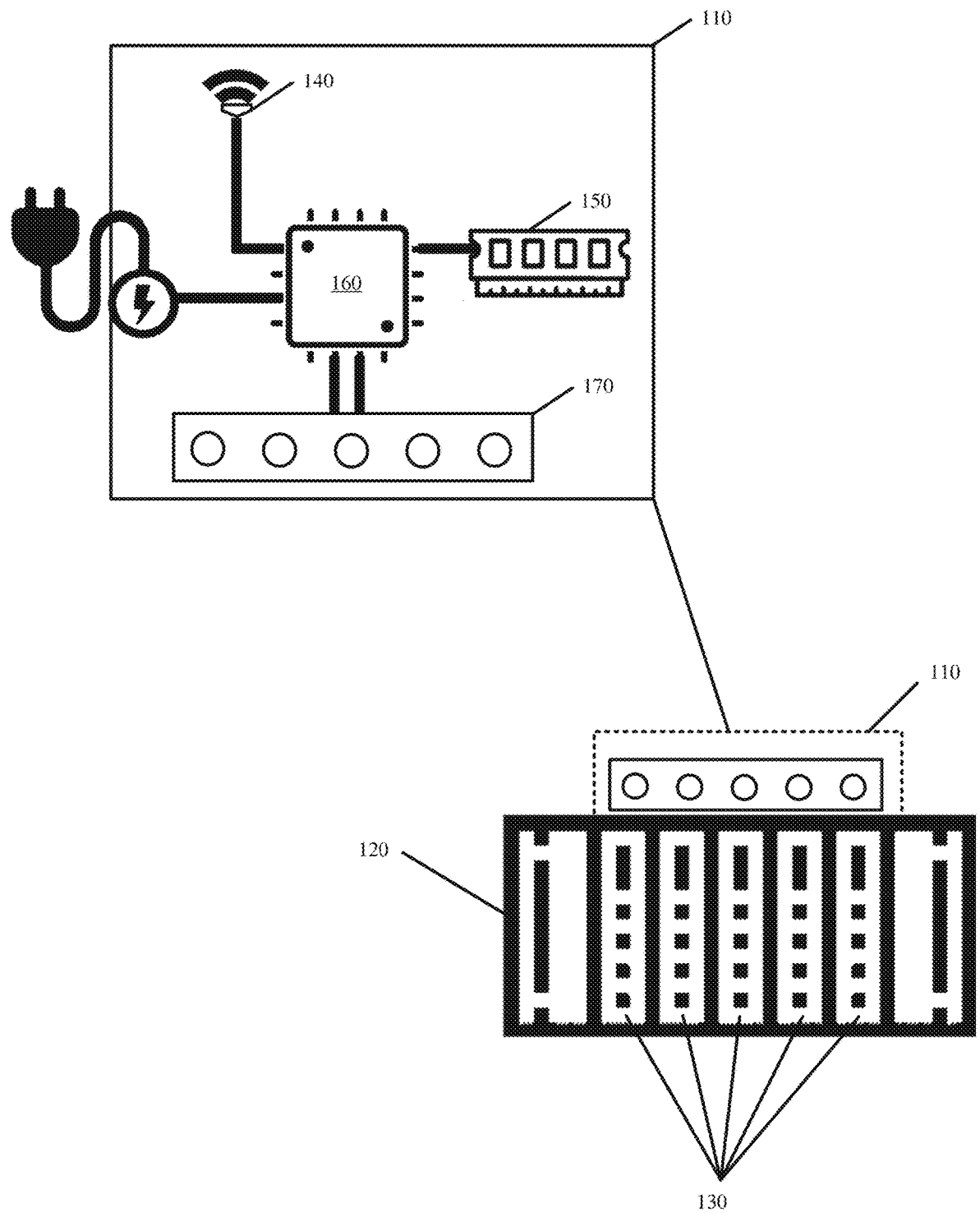
FIG. 1 illustrates an example controller in accordance with some embodiments presented herein.

FIG. 1 illustrates an example controller 110 in accordance with some embodiments presented herein. Controller 110 may be installed on a rack, chassis, and/or other storage apparatus 120. Storage apparatus 120 may house a plurality of different hardware resources 130.

Storage apparatus 120 may include a plurality of slots. Each slot may include an interface for connecting to and/or powering a different hardware resource 130. In some embodiments, each slot may include a partitioned or divided space into which a different hardware resource 130 may be inserted and wired for power and/or network connectivity.

Each hardware resource 130 may include a different device, machine, and/or other node that can be accessed remotely via a data network and that performs one or more operations. For instance, hardware resources 130 may include different storage devices for a network file system or other storage cluster. The storage devices may include magnetic disks, solid state drives, and optical storage devices. Hardware resources 130 may also include different compute nodes and/or servers for performing operations in response to user requests. The compute nodes may include one or more processors, memory, and/or network connectivity. Generally, hardware resources 130 may include any electronic device with hardware that can be shared by different users or that can be accessed remotely over a data network.

Controller 110 may include one or more of wireless radio 140, memory 150, microcontroller 160, and visual indicators 170. In some embodiments, controller 110 may include additional or fewer components.

Controller 110 may be installed directly as part of the circuit board of storage apparatus 120. Alternatively, controller 110 may be a swappable component that integrates with storage apparatus 120 via a plug-in interface or wiring that connects to the circuit board of storage apparatus 120. Controller 110 may receive power directly from storage apparatus 120.

Wireless radio 140 may include one or more of a transceiver, receiver, and/or transponder for transmitting and receiving RF signaling and/or messaging. Wireless radio 140 may include an antenna for amplifying the RF signaling.

Memory 150 may store a unique identifier for controller 110. The unique identifier may include a Media Access Control ("MAC") address or other addressing that is different for each controller 110. Memory 150 may also store a mapping of other discovered controller 110 and/or storage apparatus 120, configuration data, and/or other data that is sent and/or received from other controllers 110.

Microcontroller 160 may control the illumination of visual indicators 170, and may execute the logic for encoding messaging that is sent to other controllers 110 of the RF mesh network, and for decoding messaging that is received from other controllers 110 of the RF mesh network. Microcontroller 160 may control the illumination of each individual visual indicators 170 to convey the status of each hardware resource 130 in storage apparatus 120, and/or may control the illumination of different sets of two or more visual indicators 170 to convey more complex information to users. In some embodiments, microcontroller 160 may encode a message by changing the color and illumination pattern of an individual visual indicator 170 to provide more complex status for a particular hardware resource. For instance, microcontroller 160 may flash a particular visual indicator 170 for a particular hardware resource 130 with different colors to convey a specific error affecting that particular hardware resource 130. In some embodiments, microcontroller 160 may encode a message by changing the color and illumination pattern of two or more visual indicators 170.

Visual indicators 170 may include different lights or a display. For instance, visual indicators 170 may comprise a strip of light emitting diodes ("LEDs") with one LED for each slot or hardware resource 130 housed in storage apparatus 120. In some embodiments, each visual indicator 170 is directly aligned atop, below, or next to a slot for a different hardware resource 130 in storage apparatus 120, and may therefore be controlled by microcontroller 160 to convey status of that hardware resource 130. Each visual indicator 170 may illuminate to a plurality of different colors, and may illuminate with different patterns, sequences, and/or intensities for different durations.

To prevent interference and/or for security reasons, controller 110 may restrict power to wireless radio 140 to limit the range of the RF signaling that can be sent and received by that controller 110. However, the systems and methods described herein leverage the collective set of controllers 110 to create an RF mesh network. Controllers 110 may communicate with one another by forwarding messaging through multiple controllers 110 of the RF mesh network until the messaging reaches an intended target in the RF mesh network.

The RF mesh network may operate independent of other wired and/or wireless networks that may be used to access storage apparatus 120 and hardware resources 130. For instance, user devices may access storage apparatus 120 and hardware resources 130 via a first network, and the RF mesh network may comprise a plurality of micro-networks established between different subsets or pairs of controllers 110. Stated differently, the RF mesh network is different than a Wifi, Bluetooth, and/or other wireless networking technologies because the RF mesh network does not involve a single network. Instead, the RF mesh network is created based on different subsets or pairs of controllers 110 directly communicating with one another outside of a single common network. Effectively, each subset or pair of controllers 110 may create their own peer-to-peer network and/or may broadcast RF signaling to in-range controllers 110 without performing a network connection procedure or handshake. Accordingly, the RF signaling and/or messaging format of the RF mesh network may differ from the signaling and/or messaging format used for Wifi, Bluetooth, and/or other wireless networking technologies as well as the signaling and/or messaging format used to access storage apparatus 120 and hardware resources 130. The full peer-to-peer messaging and message forwarding provided by the RF mesh network may provide resiliency and may make the network less prone to interference as the wireless messaging is not required to pass the full distance between two communicating endpoints. Instead, intervening controllers 110 may forward messages, thereby boosting the signal each time the message is forwarded from one controller 110 to another. The forwarding of messages also allows controllers 110 to operate within much lower power envelopes than WiFi radios.

Furthermore, controllers 110 may communicate without lengthy or time-consuming authentication mechanisms. Even without the authentication mechanisms, communication between controllers 110 may be secured via message encryption (e.g., Advanced Encryption Standard 256 ("AES-256")) with certificates for identity management.

The RF mesh network may operate without implementation of IP and/or networking stacks. The RF mesh network therefore provides an extremely lightweight implementation that is also less prone to interference than WiFi or other networks.

In some embodiments, the RF mesh network may include a management device. The management device may include a node for centrally controlling and/or managing operation of controllers 110 within the RF mesh network. The management device may include controller 110 in order to integrate as part of the RF mesh network. Controller 110 of the management device may send and receive messaging from controllers 110 of the storage apparatus 120.

In some embodiments, the messaging received by the management device may be used to automatically discover storage apparatus 120 in a site and/or to map the locations of the discovered storage apparatus 120. Controller 110 of the management device may transmit messaging to controllers 110 of the storage apparatus in the RF mesh network. In some embodiments, the transmitted messaging may update visual indicators 170 of the appropriate hardware resources 130 in the different storage apparatus 120, and may modify controller 110, storage apparatus 120, and/or hardware resource 130 configurations.

Figure 2:
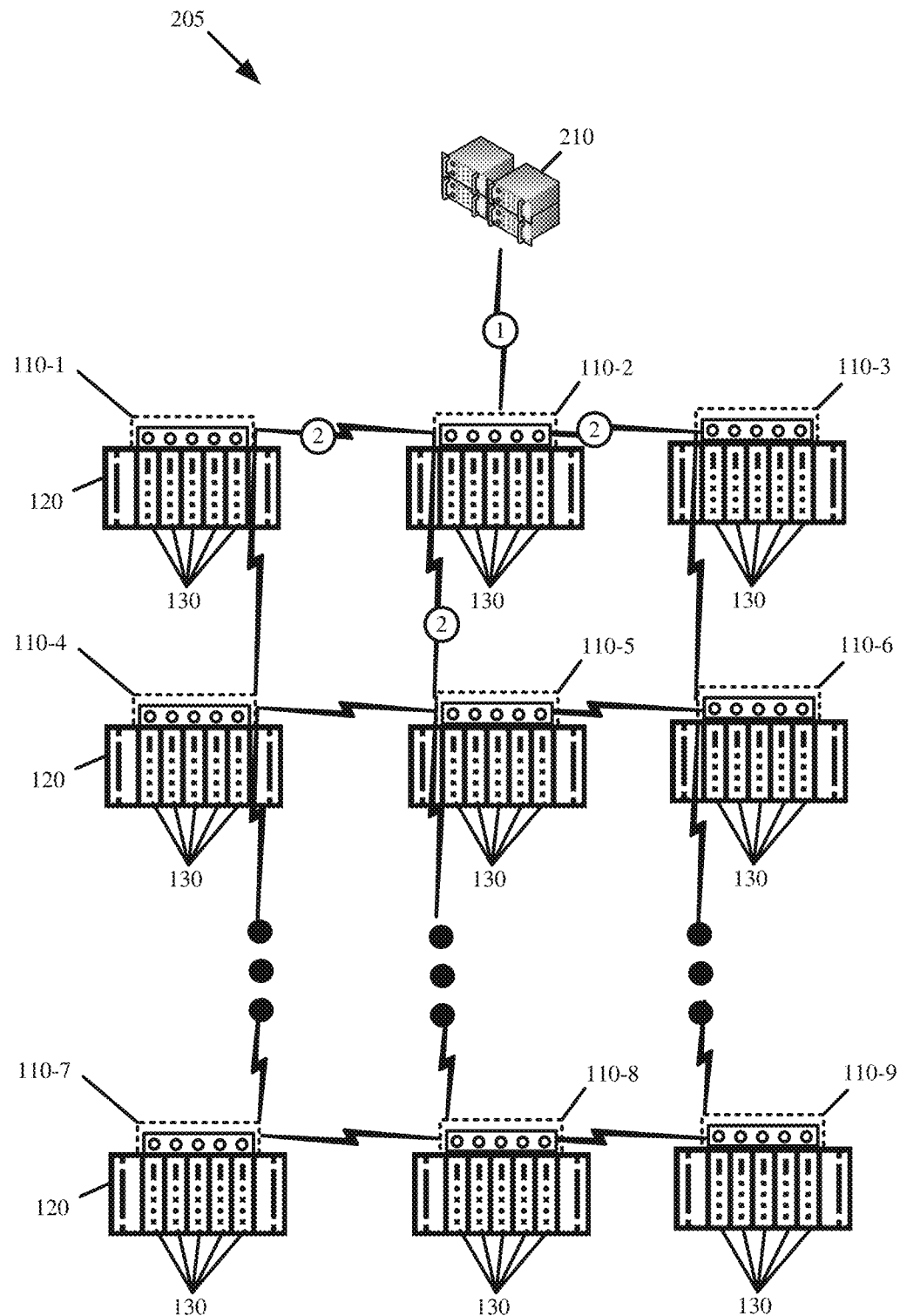
FIG. 2 illustrates example radio frequency ("RF") mesh network in accordance with some embodiments presented herein.

FIG. 2 illustrates example RF mesh network 205 in accordance with some embodiments presented herein. RF mesh network 205 may be formed by management device 210 and controllers 110-1, 110-2, 110-3, 110-4, 110-5, 110-6, 110-7, 110-8, and 110-9 (herein sometimes collectively referred to as "controllers 110" or individual referred to as "controller 110") of different storage apparatus 120 relaying RF signaling between one another.

As shown in FIG. 2, each controller 110 may have limited range, and may directly exchange messaging with juxtaposed or adjacent controllers 110. Accordingly, RF mesh network 205 may comprise a decentralized network of micro-networks created between different pairs or subsets of controllers 110.

Messaging issued (at 1) by management device 210 for first controller 110-1 may initially pass (at 1) to controller 110-2, via a first micro-network or peer-to-peer network between management device 210 and controller 110-2, before being forwarded (at 2) to controller 110-1, via a second micro-network or peer-to-peer network between controller 110-2 and controller 110-1. In some embodiments, management device 210 and controllers 110 may communicate without establishing connections. Instead, the devices (e.g., management device 210 or controller 110) and may simply broadcast the messaging, and any device that is in the RF signaling range may receive the broadcast messaging.

For instance, management device 210 may initiate (at 1) messaging for updating visual indicators 170 of controller 110-1. However, controller 110-1 may be outside the RF signaling range of management device 210. Controller 110-2 may be inside the RF signaling range of management device 210, and may therefore receive (at 1) the broadcast messaging from management device 210. Controller 110-2 may determine that it is not the intended recipient of the messaging, and may forward (at 2) the messaging to controllers 110-1, 110-3, and 110-5 by rebroadcasting the messaging to controllers 110 that are in range of controller 110-2.

Controller 110-1 may receive the rebroadcast message, may determine that it is the intended recipient, and may process the message (e.g., may update visual indicators 170 based on the received messaging). In some embodiments, controller 110-1 may initiate an acknowledgement message that is ultimately relayed to management device 210 via controller 110-2.

Controller 110-3 may also receive the rebroadcast message, may determine that it is not the intended recipient, and may forward the messaging by rebroadcasting the messaging to controllers 110-2 and 110-6 that are in range of controller 110-3. Controller 110-2 may receive the rebroadcast messaging from controller 110-3, and may determine that it has already received and forwarded the messaging. Accordingly, controller 110-2 may prevent an infinite retransmission of the same messaging, and may simply discard the messaging. However, controller 110-6 may continue forwarded the messaging to its neighboring controllers 110.

The limited broadcast range or RF signaling range of each controller 110 may secure the exchanged messaging. It is impossible to intercept the messaging unless an attacking device is located within the RF signaling range of a controller 110 in the common site. In other words, the messaging exchanged by controllers 110 is not available on a centralized network that can be accessed by external devices.

RF mesh network 205 may be further secured by sandboxing or isolating each controller 110 from any of hardware resources 130, communication interfaces, or other data network used by hardware resources 130 and/or storage apparatus 120. For instance, controller 110 may lack an interface to or may be disconnected from the data network used to transmit data to and from hardware resources 130 and/or storage apparatus 120.

In some embodiments, RF mesh network 205 may be used to automatically discover storage apparatus 120 in a site and/or to map the locations of the discovered storage apparatus 120. In some such embodiments, latency, time difference, and/or other deltas between when a message was originated or sent by one controller 110 to when that message was received by another controller 110 may be used to automatically discover and map the storage apparatus 120 locations.

The automatic discovery may be based on announcement messages that each controller 110 disseminates to other in-range controllers 110 upon being powered on or on a periodic basis. Each announcement message may uniquely identify the controller 110 that originates that announcement message. For instance, the announcement message may provide a unique identifier of the announcing controller 110. The unique identifier may include a MAC address or other address that uniquely differentiates one controller 110 from all other controllers 110. In some embodiments, the announcement message may also include a timestamp corresponding to the time at which the announcement message was generated and/or disseminated from a controller 110.

Each controller 110 may receive one or more announcement messages from neighboring controllers 110. In some embodiments, controllers 110 may forward any received announcement messages to facilitate discovery of more distant controllers 110. Latencies for forwarded announcement messages will increase, and controllers 110 may determine relative positioning of other controllers 110 based on the increasing latencies.

Upon receiving an announcement message, the receiving controller 110 may identify the sending controller 110 (e.g., the unique identifier of the sending controller 110) and the latency associated with receiving that announcement message. The latency may be calculated based on the difference between the timestamp in the announcement message and a current timestamp at the time of receiving the announcement message. The receiving controller 110 may then convert the latency into a distance measure. For instance, a latency of 1 millisecond ("ms") may correspond to an announcement message that has not been forwarded by another controller 110 and that is originated by controller 110 in an adjacent storage apparatus 120, and a latency between 2-3 ms may correspond to an announcement message from a controller 110 that is forwarded by another controller 110 before receipt. In some embodiments, controller 110 may measure signal strength and/or other characteristics associated with the received announcement message to determine the distance of the controller 110 that sent that announcement message.

Figure 3:
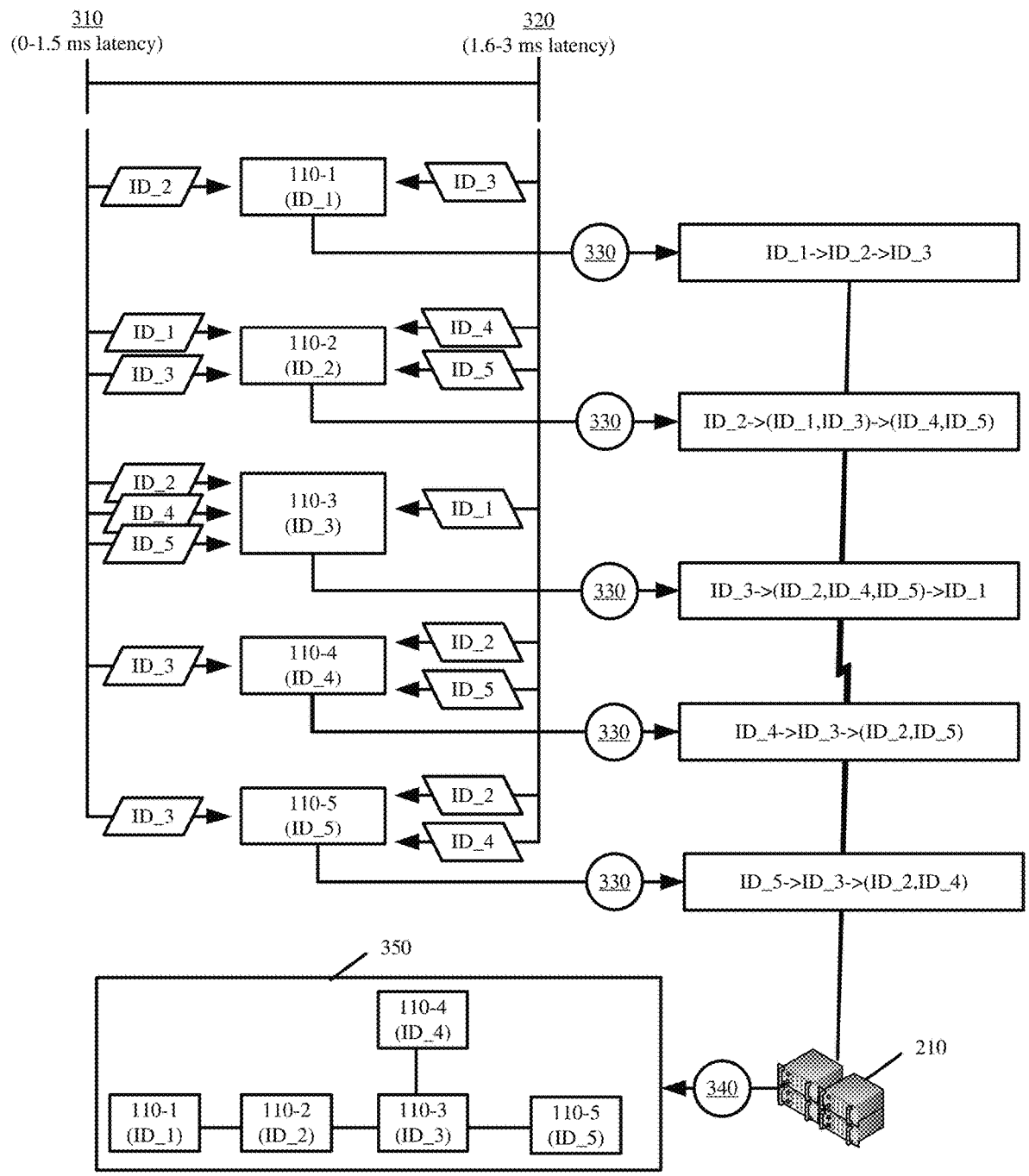
FIG. 3 illustrates an example of automatically discovering and mapping locations of different storage apparatus based on measured latencies in accordance with some embodiments presented herein.

FIG. 3 illustrates an example of automatically discovering and mapping locations of storage apparatus 120 based on measured latencies in accordance with some embodiments presented herein. FIG. 3 illustrates a first set of announcement messages that are within a first range of latencies and that controllers 110-1, 110-2, 110-3, 110-4, 110-5 receive during first time period 310, and a second set of announcement messages that are within a greater second range of latencies and that controllers 110-1, 110-2, 110-3, 110-4, 110-5 receive during second time period 320.

For instance, during first time period 310, controller 110-1 may receive an announcement message from controller 110-2 in a first latency range, controller 110-2 may receive announcement messages from controllers 110-1 and 110-3 in the first latency range, controller 110-3 may receive announcement messages from controllers 110-2, 110-4, and 110-5 in the first latency range, controller 110-4 may receive an announcement message from controller 110-3 in the first latency range, and controller 110-5 may receive an announcement message from controller 110-3 in the first latency range. Announcement messages received in the first latency range may correspond to announcement messages that are received directly from the originating controllers 110 and that are not forwarded through any other controllers 110.

During later second time period 320, controller 110-1 may receive an announcement message from controller 110-3 in a second latency range, controller 110-2 may receive announcement messages from controllers 110-4 and 110-5 in the second latency range, controller 110-3 may receive an announcement message from controller 110-1 in the second latency range, controller 110-4 may receive announcement messages from controllers 110-2 and 110-5 in the second latency range, and controller 110-5 may receive announcement messages from controller 110-2 and 110-4 in the second latency range. Announcement messages received in the second latency range may correspond to announcement messages that were forwarded through one other controller 110 than the controller 110 that originated those announcement messages.

The announcement messages may continue to be forwarded through additional controllers 110, and may arrive at other controllers 110 with larger latencies. In some embodiments, the forwarding of an announcement message or acknowledgement messages from one controller 110 to another may add between hundreds of microseconds to several milliseconds to the overall latency of that message.

Controllers 110 may produce (at 330) an internal map of controllers 110 that are determined to be neighbors, one hop away, two hops away, etc. based on the received announcement messages. Controllers 110 may provide (at 340) the internal maps as discovery messages to management device 210 via RF mesh network 205.

Management device 210 may aggregate the discovery messages, and may produce (at 340) positional map 350 of controllers 110 and their associated storage apparatus 120 based on the internal map created by each controller 110. For instance, management device 210 may determine that controller 110-2 is adjacent to controllers 110-1 and 110-3, that controllers 110-4 and 110-5 are two hops from controller 110-2, and that controllers 110-4 and 110-5 are adjacent to controller 110-3 based on the aggregated internal maps.

In some other embodiments, each particular controller 110 may modify its announcement messages to include the unique identifiers of other controllers 110 that the particular controller 110 has discovered. The modified announcement message may include the measured distance, latencies, and/or positioning of the discovered controllers 110. By including the identifiers, distances, latencies, and/or positioning of other discovered controllers 110 in the modified announcement messages, each controller 110 receiving a modified announcement message may determine its positioning relative to the other controllers 110 that are identified in the modified announcement message. In other words, each controllers 110 may gradually build its own copy of positional map 350 based on the modified announcement messages.

Figure 4:
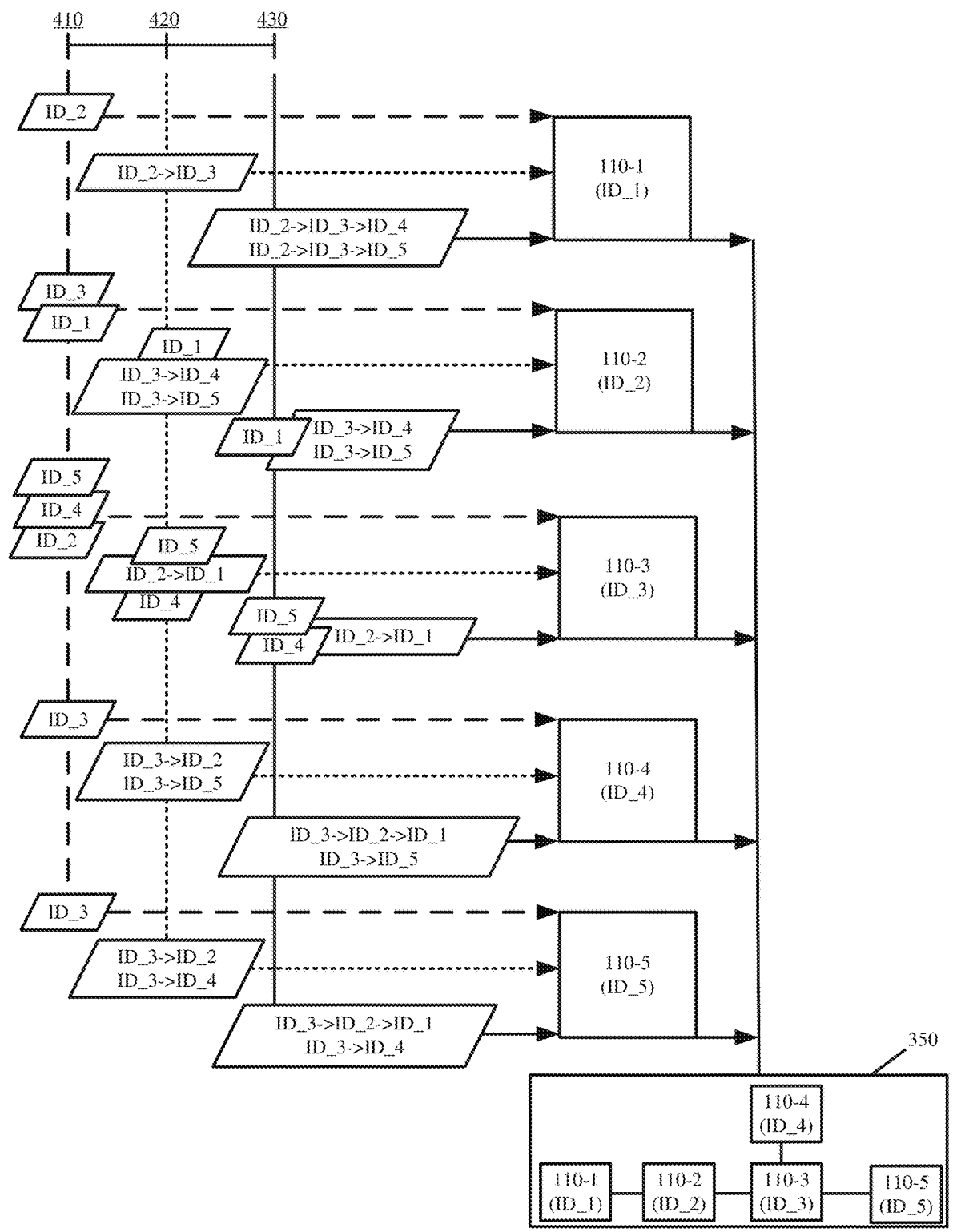
FIG. 4 illustrates exchanging modified announcement messages to produce a positional map of controllers in accordance with some embodiments presented herein.

FIG. 4 illustrates exchanging the modified announcement messages to produce positional map 350 of controllers 110 in accordance with some embodiments presented herein. During first time 410, each controller 110 may issue a first set of announcement messages that provide the unique identifier of the issuing controller 110. Based on this initial set of announcement messages, each controller may discover neighboring controllers 110. In this implementation, controllers 110 need not forward the announcement messages they receive to other controllers 110.

After receiving the first set of announcement messages and during subsequent second time 420, controllers 110 may issue a second set of modified announcement messages that provide the unique identifier of the issuing controller 110 and the unique identifier of any neighboring controllers 110 discovered as a result of receiving the first set of announcement messages. Each controller 110 may receive one or more of second set of modified announcement messages from neighboring controllers 110, and may update the internal mapping to account for the controllers 110 that are more than one hop away and that are included in the second set of modified announcement messages.

Controllers 110 may continue updating the modified announcement messages as additional controllers 110 are discovered from the announcement messages of other controllers 110. The discovery may continue in this fashion until controllers 110 have a complete mapping of the positions of other controllers 110 operating to create the same RF mesh network. For instance, FIG. 4 illustrates each controller 110 issuing a third set of modified announcement messages during third time 430. Based on the third set of modified announcement messages, each controller 110 may generate its own positional map 350 for the relative positioning and/or arrangement of controllers 110. In some such embodiments, management device 210 may receive the same modified announcement messages, and may produce positional map 350 in conjunction with controllers 110 of storage apparatus 120.

In some other embodiments, each controller 110 may provide an acknowledgement message in response to a received announcement message. The acknowledgement message may include the unique identifier (e.g., source identifier) of controller 110 providing the acknowledgement message and/or the unique identifier of controller 110 found in the announcement message (e.g., destination identifier).

An acknowledgement message for a particular announcement message may be forwarded until it reaches the particular controller 110 that originated that particular announcement message. The particular controller 110 may analyze the delta between the time an announcement message was sent and other controllers 110 provided the acknowledgement message in return. The delta may correspond to a latency or time measurement. From the observed deltas, the particular controller 110 may generate a map for the positioning of the other controllers 110.

In addition to discovering controllers 110 and/or storage apparatus 120 via RF mesh network 205, management device 210 may perform a separate discovery operation to detect hardware resources 130 that are installed within each storage apparatus 120 that is associated with a discovered controller 110. Management device 210 may also map each discovered hardware resource 130 to a different visual indicator 170 of controller 110 in the same storage apparatus 120 as the hardware resource 130 so that each visual indicator 170 may be used to convey status of a different mapped hardware resource 130.

In some embodiments, management device 210 may be configured with a lookup table. The lookup table may track which set of hardware resources 130 is installed in which slots of a storage apparatus 120. For instance, as an installer places hardware resources 130 into a particular storage apparatus 120, the installer may scan or enter create an entry or association in the lookup table that identifies each of the installed hardware resources 130, the slots of a particular storage apparatus 120 in which the hardware resources 130 are installed, and/or the unique identifier of the particular storage apparatus 120 or the controller 110 for that particular storage apparatus 120.

In some embodiments, management device 210 may build the lookup table. Hardware resources 130 may be programmed to perform a discovery operation upon powering on. The discovery operation performed by a hardware resource 130 may include obtaining a network address and/or slot identifier with which that hardware resource 130 may be accessed, and/or registering the network address and/or slot identifier with management device 210. The network address may be assigned to the storage apparatus 120 in which that hardware resource 130 is installed, and the slot identifier, in conjunction with the network address, may be used to address different hardware resources 130 in the same storage apparatus 120. In some embodiments, management device 210 may use the network address to determine which storage apparatus 120 a particular hardware resource 130 is located, and may use the slot identifier to determine the position of that particular hardware resource 130 in that storage apparatus 120.

The lookup table may also include a map with the positioning of each storage apparatus 120. In some embodiments, management device 210 may generate a positional map for the hardware resources, in a similar manner as positional map 350 for controllers 110, by measuring the latency of messages that are sent by each hardware resource 130.

Management device 210 may compare the positional map 350 for the discovered locations and arrangement of controllers 110 to the mapped positioning of each storage apparatus 120. From the comparison, management device 210 may determine which controller 110 is associated with which storage apparatus 120 and/or set of hardware resources 130 installed in a particular storage apparatus 120. Management device 210 may further determine the slot where each hardware resource 130 is installed in a particular storage apparatus 120, and may determine the corresponding visual indicator 170 for that slot or hardware resource 130. More specifically, management device 210 may determine a first hardware resource in a first slot of storage apparatus 120, and may select and/or use a first visual indicator 170 of the controller 110 at that storage apparatus that is aligned with the first slot or the position of the first hardware resource to convey status of the first hardware resource. In other words, management device 210 may map individual visual indicators 170 for controller 110 of a particular storage apparatus 120 to different hardware resources that are aligned with those visual indicators 170, and may control that controller 110 to provide status and/or other messaging for each of the hardware resources in that storage apparatus 120.

Figure 5:
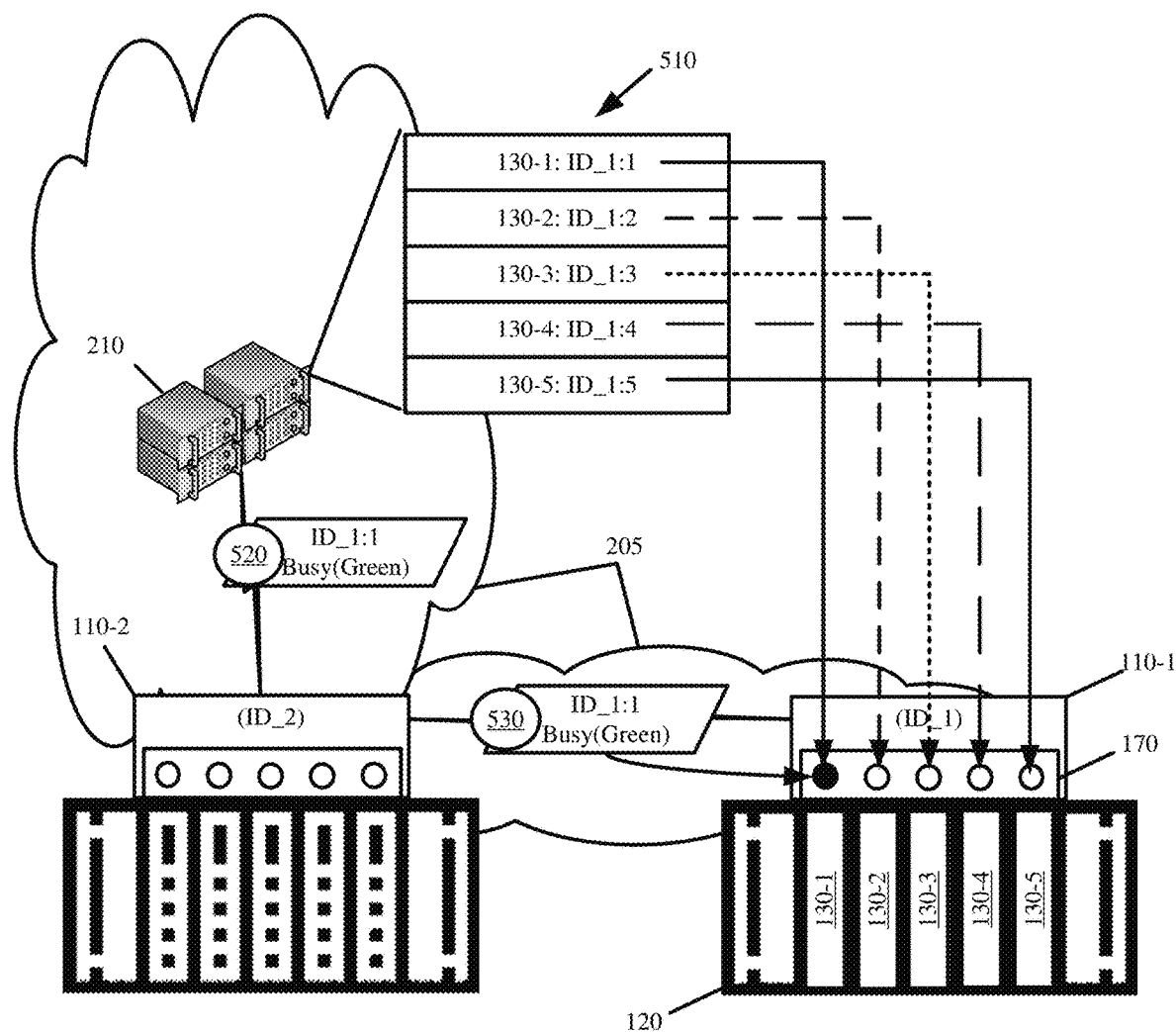
FIG. 5 illustrates an example of correlating detected hardware resources in a particular storage apparatus to visual indicators of a controller in that same particular storage apparatus in accordance with some embodiments presented herein.

FIG. 5 illustrates an example of correlating detected hardware resources 130 in a particular storage apparatus 120 to visual indicators 170 of a controller 110-1 in that same particular storage apparatus 120 in accordance with some embodiments presented herein. As shown in FIG. 5, management device 210 may track the positioning of hardware resources 130-1, 130-2, 130-3, 130-4, and 130-5 (herein sometimes collectively referred to as "hardware resources 130" or individual referred to as "hardware resource 130") in the particular storage apparatus 120, and may store configuration 510 that maps the positioning of each hardware resource 130 to the unique identifier for controller 110-1 of that particular storage apparatus 120 and a slot identifier.

Management device 210 may control the first visual indicator of controller 110-1 to convey the status of hardware resource 130-1 by issuing control messaging to the unique identifier of controller 110-1 and the first slot identifier. RF mesh network 205 may forward the control messaging from management device 210 to controller 110-1. For instance, management device 210 may broadcast (at 520) the control messaging with the unique identifier of controller 110-1 and the first slot identifier, and controller 110-2 may receive (at 520) the control messaging.

Controller 110-2 may determine that it is not the intended recipient of the control messaging, and may rebroadcast (at 530) the control messaging. Controller 110-1 may receive (at 530) the control messaging after it is rebroadcast by controller 110-2.

Controller 110-1 may determine that it is the intended recipient for the control messaging based on the unique identifier of controller 110 found in the control messaging. Accordingly, controller 110-1 may process the control messaging. Controller 110-1 may update the first visual indicator, that is aligned with the position of hardware resource 130-1, based on the first slot identifier placed in the control messaging and the contents of the control messaging, wherein the control messaging contents may specify the manner with which controller 110 is to change illumination of the first visual indicator (e.g., change color, flash, change intensity, etc.). In this example, controller 110-1 may illuminate the first visual indicator a first color (e.g., green) to indicate that hardware resource 130 is busy.

FIG. 5 illustrates management device 210 issuing messages to controllers 110 using RF signaling and RF mesh network 205, and relying on RF mesh network 205 to transfer the messages to the correct controller 110. In some other embodiments, management device 210 and controllers 110 may use a publisher and subscriber model to exchange messaging.

Management device 210 may act as the publisher, and may generate messages for specific controllers 110. Management device 210 may enter the messages into a database with the unique identifier for the intended controller 110.

Controllers 110 may act as subscribers, and may periodically query the database for any messages with the unique identifier of that controller 110. If a message with the unique identifier of a particular controller 110 is available, the message is transmitted, via RF mesh network 205, to that particular controller 110.

Management device 210 may control the updating of visual indicators 170 in response to monitoring the status of hardware resources 130. In some embodiments, management device 210 may receive commands and operations for hardware resources 130 to perform from a set of user devices, and may distribute the commands and operations to hardware resources 130 over a data network that is different than RF mesh network 205. In some other embodiments, management device 210 may be a proxy or passive device that inspects the commands and operations before distribution to hardware resources 130. Management device 210 may also receive acknowledgements, status updates, and/or diagnostic data from hardware resources 130 via the data network. Based on the commands, operations, acknowledgements, status updates, and/or diagnostic data detected by management device 210, management device 210 may issue the control messages over RF mesh network 205 to update visual indicators 170 of corresponding controllers 110.

Figure 6:
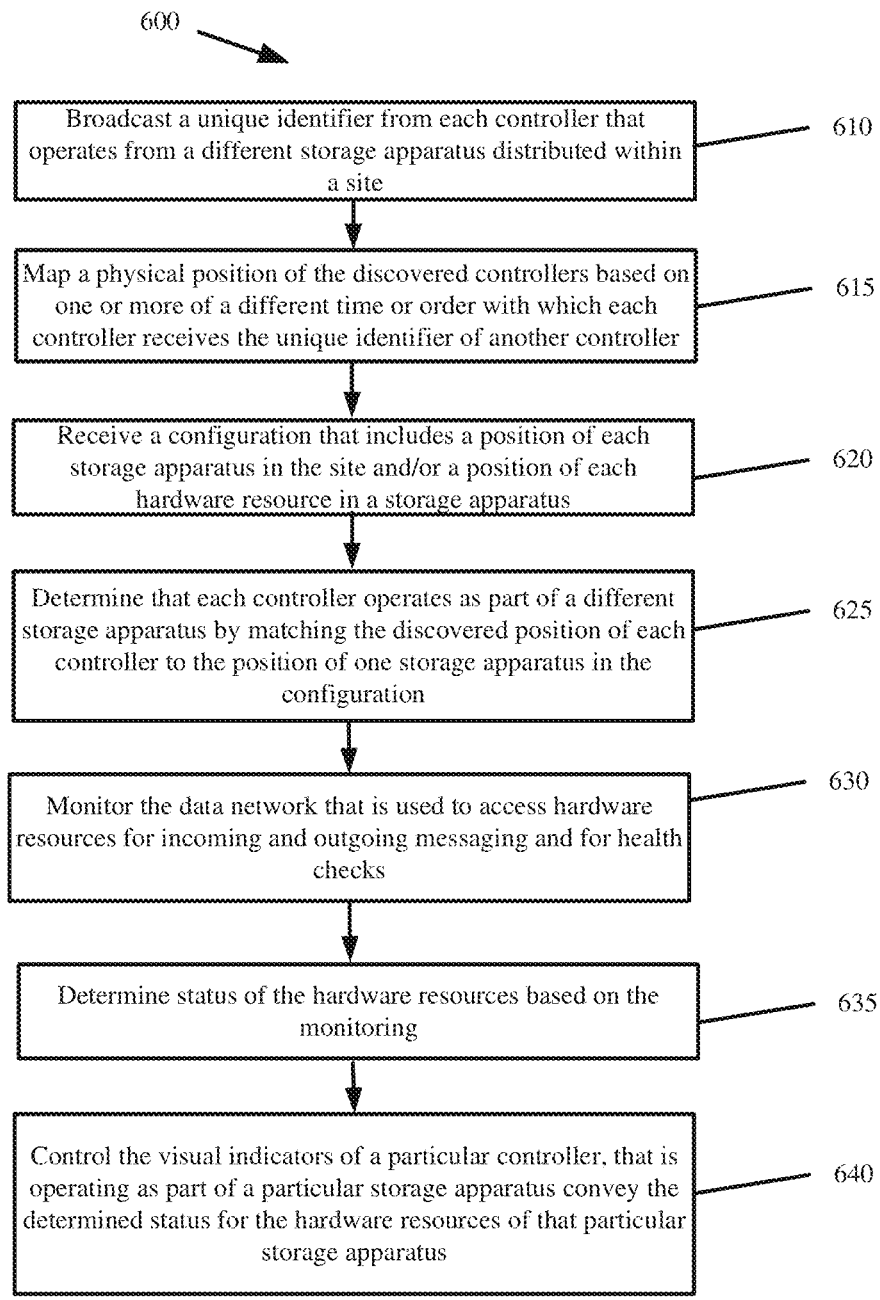
FIG. 6 presents a process for mapping the location of controllers discovered in a site via the RF mesh network, and correlating the controller visual indicators to different hardware resources in a storage apparatus in accordance with some embodiments presented herein.

FIG. 6 presents a process 600 for mapping the location of controllers 110 discovered in a site via RF mesh network 205, and correlating the visual indicators 170 to different hardware resources 130 in a storage apparatus in accordance with some embodiments presented herein. Process 600 may be performed by management device 210 and one or more controllers 110 exchanging RF signaling over RF mesh network 205 while storage apparatus 120 and hardware resources 130 communicate with management device 210 over a different network.

Process 600 may include broadcasting (at 610) a unique identifier from each controller 110 that operates from a different storage apparatus 120 that is distributed within a site. Controllers 110 may broadcast (at 610) their own unique identifier, and may provide the unique identifier of any other controller 110 that is discovered as a result of received broadcasts. The unique identifier of other controllers 110 may be provided in a linked list or other format that identifies controllers 110 that are direct neighbors of a particular controller 110, wherein the particular controller 110 may receive the broadcasts from a direct neighbor within a threshold amount of time or latency of the broadcast being originated by another controller 110. Controllers 110 may also forward the broadcasts they receive from other controllers 110.

Process 600 may include mapping (at 615) a physical position of the discovered controllers 110 based on one or more of a different time or order with which each controller 110 receives the unique identifier of another controller 110. The mapping (at 615) may be based on latencies associated with when a controller 110 receives a broadcast that is originated by another controller 110, and/or controllers 110 identifying their direct neighbors to other controllers 110 via RF mesh network 205. The mapping (at 615) may also be based on controllers 110 issuing modified broadcast messages that include unique identifiers of other discovered controllers 110 in a particular arrangement or ordering.

Process 600 may include receiving (at 620) a configuration that includes a position of each storage apparatus 120 in the site and/or a position of each hardware resource 130 in a storage apparatus 120. The configuration may be created by an administrator that installs or configures storage apparatus 120 and/or hardware resources 130. In some embodiments, management device 210 may produce the configuration based on messaging that storage apparatus 120 and/or hardware resources 130 pass over the data network.

Process 600 may include determining (at 625) that each controller 110 operates as part of a different storage apparatus 120 by matching the discovered position of each controller 110 to the position of one storage apparatus 120 in the configuration. Determining (at 625) the controller 110 to storage apparatus 120 correlation may further include determining an alignment of visual indicators 170 for each controller 110 with hardware resources 130 in a correlated storage apparatus 120 using the configuration. For instance, a hardware resource 130 that is identified in the configuration to be in a first slot of storage apparatus 120 may be aligned with a first visual indicator 170 for the controller 110 in that storage apparatus 120. Accordingly, process 600 may include assigning a different visual indicator 170 to convey status of a different hardware resource 130 based on the alignment.

Process 600 may include monitoring (at 630) the data network that is used to access hardware resources 130 for incoming and outgoing messaging. The monitoring (at 630) may also include performing various health checks and determining that conditions are met (e.g., a response is provided within some time of a command). In some embodiments, management device 210 may monitor (at 630) a database, file system, or other node where operations for hardware resources 130 are aggregated and/or distributed.

Process 600 may include determining (at 635) status of hardware resources 130 based on the monitoring. Determining (at 635) the status may include inserting entries in a database for the determined status of different hardware resources 130 based on the monitoring messages sent to and from hardware resources 130, the health checks, and/or hardware resource 130, storage apparatus 120, and/or data network conditions monitored by management device 210.

Process 600 may include controlling (at 640) visual indicators 170 of a particular controller 110, that is operating as part of a particular storage apparatus 120, by broadcasting, using the RF signaling, one or more control messages with the unique identifier of the particular controller 110. Controlling (at 640) visual indicators 170 may include changing each individual visual indicator 170 to convey the determined (at 635) status of a different hardware resource 130 in that particular storage apparatus 120 that is aligned with that visual indicator 170. The control messages may therefore be defined according to the determined (at 635) status. Process 600 may repeat or run continually to enable detection of new hardware resources 130, and to update the status of hardware resources 130 via visual indicator 170.

Figure 7:
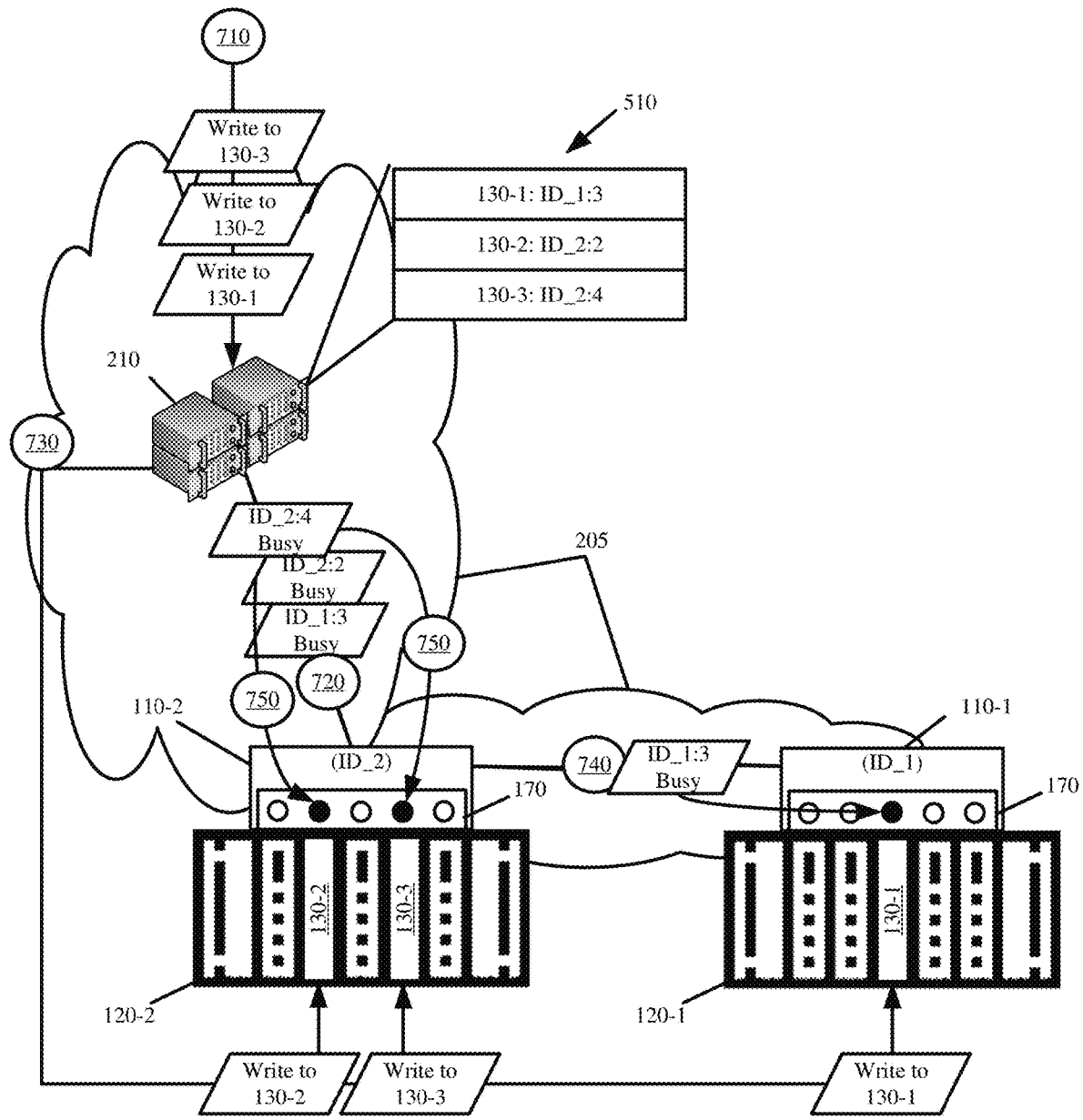
FIG. 7 illustrates an example of a management device updating visual indicators for a particular set of hardware resources in accordance with some embodiments presented herein.

FIG. 7 illustrates an example of management device 210 updating visual indicators 170 for a particular set of hardware resources 130 in accordance with some embodiments presented herein. As shown in FIG. 7, management device 210 may receive (at 710) commands or operations for different hardware resources 130 to perform. The commands may be issued by one or more devices or machines that access files from a remote storage cluster that is formed by hardware resources 130. The commands may implicate a first file that is stored on first hardware resource 130-1 in a third slot of first storage apparatus 120-1, a second file that is stored on second hardware resource 130-2 in a second slot of second storage apparatus 120-2, and a third file that is stored on third hardware resource 130-3 in a fourth slot of second storage apparatus 120-2.

Management device 210 may reference configuration 510 to determine the unique identifier and slot identifier for the controller visual indicator for each of first hardware resource 130-1, second hardware resource 130-2, and third hardware resource 130-3. Management device 210 may generate control messages with the determined unique identifier and the slot identifier to update the corresponding visual indicators.

Management device 210 may transmit (at 720) the generated control messages onto RF mesh network 205 at the same time as or contemporaneous with transmitting (at 730) the commands to first, second, and third hardware resources 130 over the data network. Transmitting (at 720) the control message may include broadcasting the control messages from management device 210 to any controllers 110 that are in RF signaling range of management device 210. In other words, management device 210 may provide (at 720) the RF signaling to update visual indicators 170 of controllers 110-1 and 110-2 over a first set of micro-networks of RF mesh network 205, and may provide (at 730) the commands for hardware resources 130-1, 130-2, and 130-3 to execute over a different second network. The commands may traverse the second network. The command for hardware resource 130-1 may be received at storage apparatus 120-1, and may be routed to hardware resource 130-1 for execution. Similarly, the commands for hardware resources 130-2 and 130-3 may be received at storage apparatus 120-2, and may be routed to hardware resources 130-2 and 130-3 for execution.

The control messages passed over RF mesh network 205 may be forwarded by different controllers 110 until the control messages arrive at controllers 110 that are identified with the unique identifiers specified in the messages. For instance, controller 110-2 may receive each of the control messages broadcast (at 720) by management device 210.

Controller 110-2 may determine that two of the messages include the unique identifier of controller 110-2, and one of the messages includes a different controller identifier. Accordingly, controller 110-2 may forward the control message with the unique identifier of controller 110-1 by broadcasting (at 740) that control message to any controllers 110 that are in RF signaling range of controller 110-2, and may process (at 750) the other two control messages that include the unique identifier of controller 110-2. In response to processing (at 750) the two control messages, controller 110-2 may determine that the messages specify changing the status of the second and fourth visual indicators in the set of visual indicators 170 of controller 110-2, wherein the second and fourth visual indicators may be aligned with the positions of second hardware resource 130-2 at the second slot of storage apparatus 120-2 and third hardware resource 130-3 at the fourth slot of second storage apparatus 120-2. Accordingly, controller 110-2 may modify (at 750) the second visual indicator and the fourth visual indicator based on the received control messages. Updating the second and fourth visual indicators may include changing the color and/or illumination pattern of each visual indicator to convey a busy state for hardware resources 130-2 and 130-3. For instance, controller 110-2 may illuminate the second and fourth visual indicators to a green color.

Controller 110-1 may receive the control message that is rebroadcast by controller 110-2, may determine that the control message includes the unique identifier of controller 110-1, and may process the control message as a result. In particular, controller 110-1 may update (at 760) a third visual indicator, in the set of visual indicators 170 of controller 110-1, that is aligned with the position of first hardware resource 130-1 and/or the third slot of storage apparatus 120-1.

Accordingly, management device 210 may monitor incoming and outgoing messaging of each hardware resource 130 as well as the status of each hardware resource 130 in order to generate the control messaging. The control messaging may control different controllers 110 in changing the illumination of different visual indicators 170 that are aligned with and/or that otherwise convey status for those hardware resources 130.

Incoming messages may include commands and/or operations that other devices send to hardware resources 130. The commands and/or operations may include storage operations, compute operations, requests for content, requests for services, requests for data, database queries, and/or tasks that can be performed by hardware resources 130. Management device 210 may inspect the command and/or operation to determine a visual indicator change that conveys appropriate status for that command and/or operation. For instance, management device 210 may issue a first message to change a particular visual indicator 170 to a first color in response to a storage operation (e.g., a write operation), and may issue a second message to change the particular visual indicator 170 to a second color in response to a retrieval operation (e.g., a read operation).

Outgoing messages may include output that is returned in response to execution of the commands and/or operations, confirmation or acknowledgement messaging from the particular hardware resource 130, and/or health data. Here again, management device 210 may select a different color or illumination pattern for the particular visual indicator 170 based on the different outgoing messages provided by the corresponding hardware resource 130 in the slot or positioning of that particular visual indicator 170.

In some embodiments, management device 210 may determine status of hardware resources 130 without any incoming or outgoing messaging. For instance, management device 210 may issue a command to a particular hardware resource 130. If the particular hardware resource 130 does not respond within a timeout interval, management device 210 may determine that the particular hardware resource 130 has experienced an error or failure. Similarly, management device 210 may monitor the data network or network path for accessing the particular hardware resource 130, and may detect an error or issue that prevents access to the particular hardware resource 130. Management device 210 may select a different color or illumination pattern for the visual indicator 170, that is used to convey status of the particular hardware resource 130, based on the determined status of the particular hardware resource 130. Management device 210 may provide messaging to controller 110, that controls that particular visual indicator 170, and the messaging may cause that controller to change the color or illumination pattern of the particular visual indicator 170 even when the data network used to access any of hardware resources 130 is unavailable or when the particular hardware resource 130 becomes unavailable. In other words, RF mesh network 205 allows management device 210 and controllers 110 to provided updated status of hardware resources 130 and/or the data network to access those hardware resources 130 even when one or more of hardware resources 130 or the data network are inaccessible.

Management device 210 may be configured with a mapping that correlates different hardware resource 130 status to different visual indicator 170 colors and/or illumination patterns. An illumination pattern may correspond to the duration and/or intensity of illumination as well as a sequence of the same or different colors being illuminated (e.g., a visual indicator 170 repeating between flashing blue for 1 second and red for 1 second).

Figure 8:
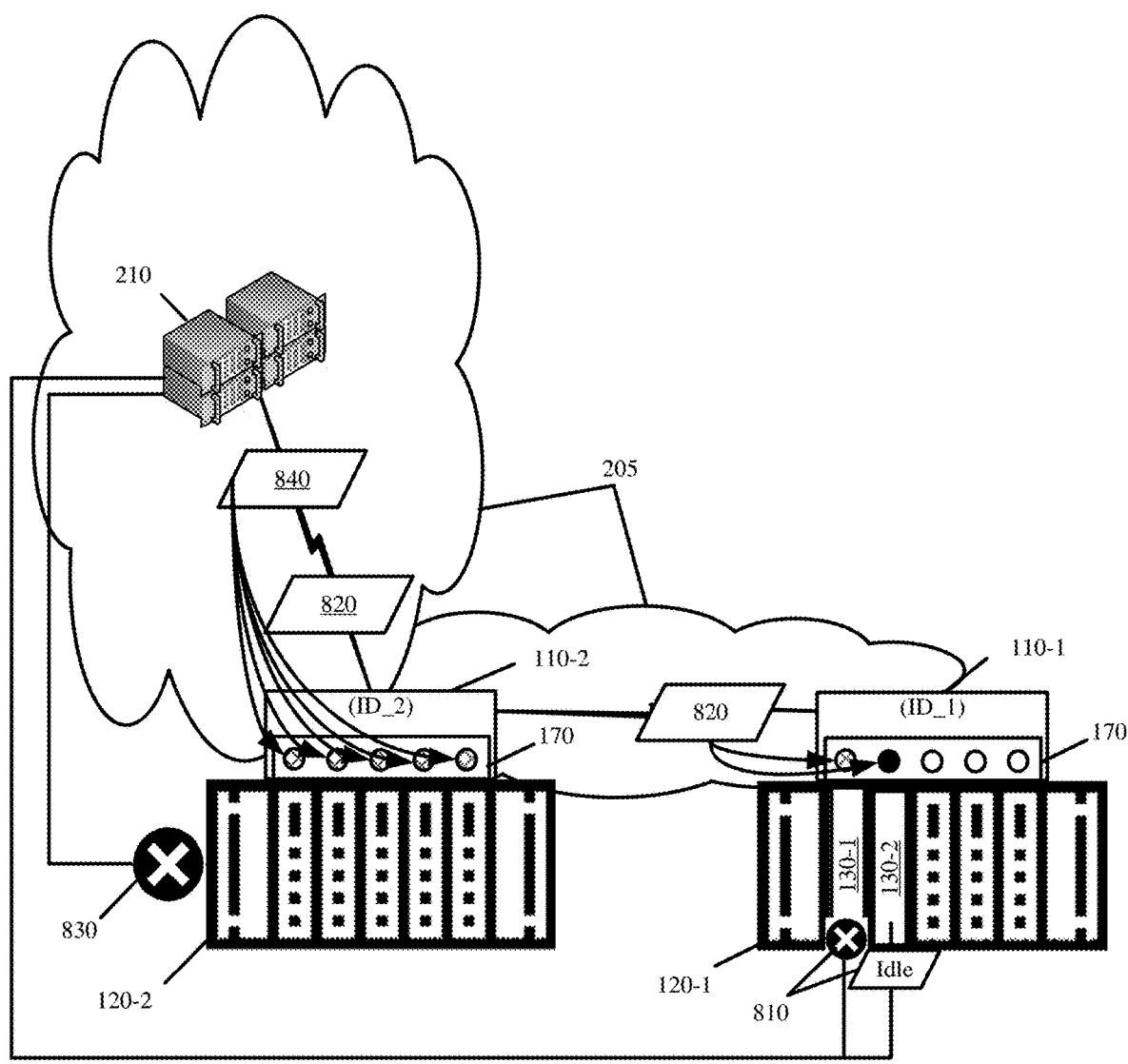
FIG. 8 illustrates using the RF mesh network to convey different hardware resource status even when those hardware resources or the network used to access the hardware resources become unavailable.

FIG. 8 illustrates using RF mesh network 205 to convey different hardware resource 130 status even when those hardware resources 130 or the network used to access hardware resources 130 become unavailable. As shown in FIG. 8, management device 210 detect (at 810) a failure that prevents network access to hardware resource 130-1 in first storage apparatus 120-1, and an updated status from hardware resource 130-2 in first storage apparatus 120-2. In response, management device 210 may direct first set of messages 820 to first controller 110-1 of first storage apparatus 120-1, and first set of messages 820 may propagate to controller 110-1 via RF mesh network 205.

First controller 110-1 may receive first set of messages 820, and may change the coloring and/or illumination pattern of different visual indicators 170 to indicate the different status of hardware resources 130-1 and 130-2. For instance, a first color for a first visual indicator may indicate that first hardware resource 130-1, that is adjacent or aligned with the first visual indicator, is experiencing a failure and/or is unavailable, whereas a second color for a second visual indicator may indicate that second hardware resource 130-2, that is adjacent or aligned with the second visual indicator, is idle or available. In some embodiments, first controller 110-1 may use a specific color or sequence of flashes to convey a particular issue or failure affecting hardware resource 130-1. RF mesh network 205 allows management device 210 and/or controllers 110 to continue to update the status of hardware resources 130 even when individual resources 130 become unavailable.

Also shown in FIG. 8, management device 210 may detect (at 830) that second storage apparatus 120-2 and/or hardware resources 130 of second storage apparatus 120-2 are unreachable because of a data network failure or storage apparatus failure that prevents communication with hardware resources 130 of second storage apparatus 120-2. Accordingly, management device 210 may provide second set of messages 840 to controller 110-2 via RF mesh network 205.

Controller 110-2 may receive second set of messages 840, and may change the coloring and/or illumination pattern of all visual indicators 170 on the second storage apparatus 120-2 in response to second set of messages 840. For instance, controller 110-2 may change the coloring of visual indicators 170 to indicate that second storage apparatus 120-2 and/or hardware resources 130 of second storage apparatus 120-2 have experienced a failure and/or have become unreachable. Here again, RF mesh network 205 allows management device 210 and/or controllers 110 to continue to update the status of hardware resources 130 even when there is a network failure or storage apparatus failure that prevents communication with or access to the failing storage apparatus 120-2 or the hardware resources 130 installed therein.

In some embodiments, management device 210 and/or controllers 110 may control visual indicators 170 to assist a user in locating one or more hardware resources 130. For instance, a storage apparatus 120 may house 20 or more disk drives, and each disk drive may be a few inches in size making it difficult to distinguish from all other disk drives. However, when visual indicators 170 are aligned with the positioning of the disk drives, management device 210 may signal the controller 110 of that storage apparatus 120 to flash the visual indicator 170 that is aligned with a failing disk drive a different color than other visual indicators for disk drives that are operational. To better draw focus to the failing disk drive, management device 210 and/or controller 110 may collectively control visual indicators 170. For instance, management device 210 and/or controller 110 may turn off all visual indicators 170 for disk drives that are operation on a particular storage apparatus 120, and flash only the visual indicator 170 for the failing disk drive on the particular storage apparatus 120 to minimize the light interference. This collective operation of visual indicators 170 for each controller 110 allows for encoding and presentation of complex information.

Figure 9A:
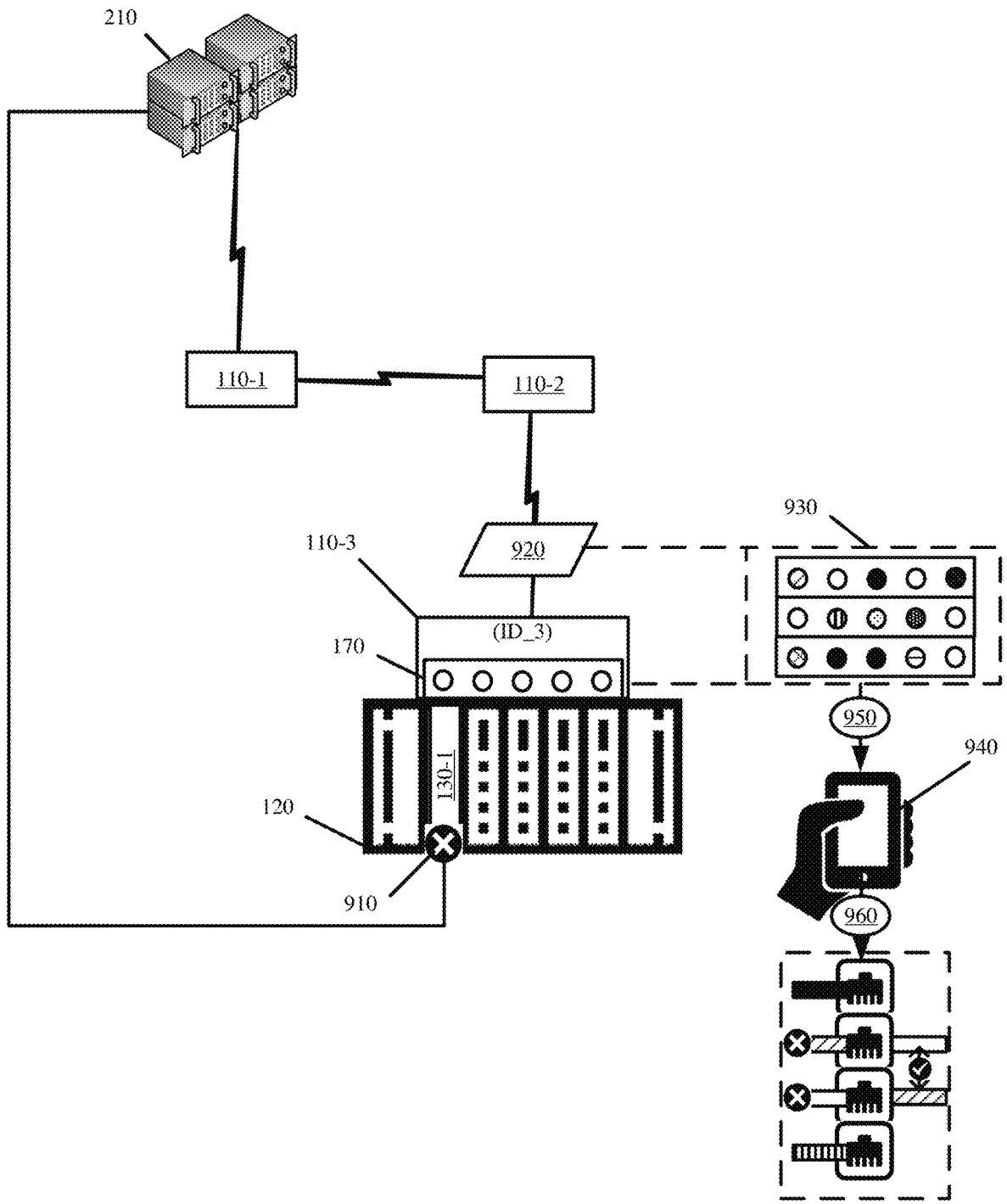
FIG. 9A illustrates an example of performing collective control over two or more visual indicators using the RF mesh network in accordance with some embodiments presented herein.

FIG. 9A illustrates an example of performing collective control over two or more visual indicators 170 using RF mesh network 205 in accordance with some embodiments presented herein. Management device 210 may detect (at 910) a specific error affecting a single hardware resource 130-1 in storage apparatus 120. Management device 210 may determine that the specific error can be resolved if a user performs a certain action on that hardware resource 130-1 or that storage apparatus 120. Management device 210 may encode the specific error and/or certain action that the user is to perform in control message 920 that is passed to controller 110-3 of that storage apparatus 120 via RF mesh network 205.

In response to receiving control message 920, controller 110-3 may illuminate (at 930) two or more of visual indicators 170 with a sequence of colors, or may flash (at 930) two or more of visual indicators 170 with a specific pattern that encodes the specific error and/or certain action to perform. A user may stand before the particular storage apparatus, and may use device 940 with a camera (e.g., a smartphone) or other sensor to capture (at 950) the illumination and/or flashing of visual indicators 170. Device 940 may capture (at 950) the illumination and/or flashing of visual indicators 170 from a distance of several feet due to the brightness and different colors of visual indicators 170. Accordingly, device 940 may capture (at 950) an encoded message without being placed directly in front or next to visual indicators 170.

Device 940 may decode the specific error and/or certain action from the captured illumination and/or flashing of visual indicators 170. For instance, device 940 may decode the illumination and/or flashing to present (at 960) a wiring diagram that illustrates how to correctly wire and/or connect hardware resource 130-1. In some embodiments, the illumination and/or flashing may encode a Uniform Resource Locator ("URL") that device 940 may use to retrieve the wiring diagram or other information. In some embodiments, the illumination and/or flashing may encode textual data that device 940 may decode and present in a display. Accordingly, the illumination and/or flashing of visual indicators 170 may be used to convey data in a variety of forms and formats to a user that is physically present before visual indicators 170.

Figure 9B:
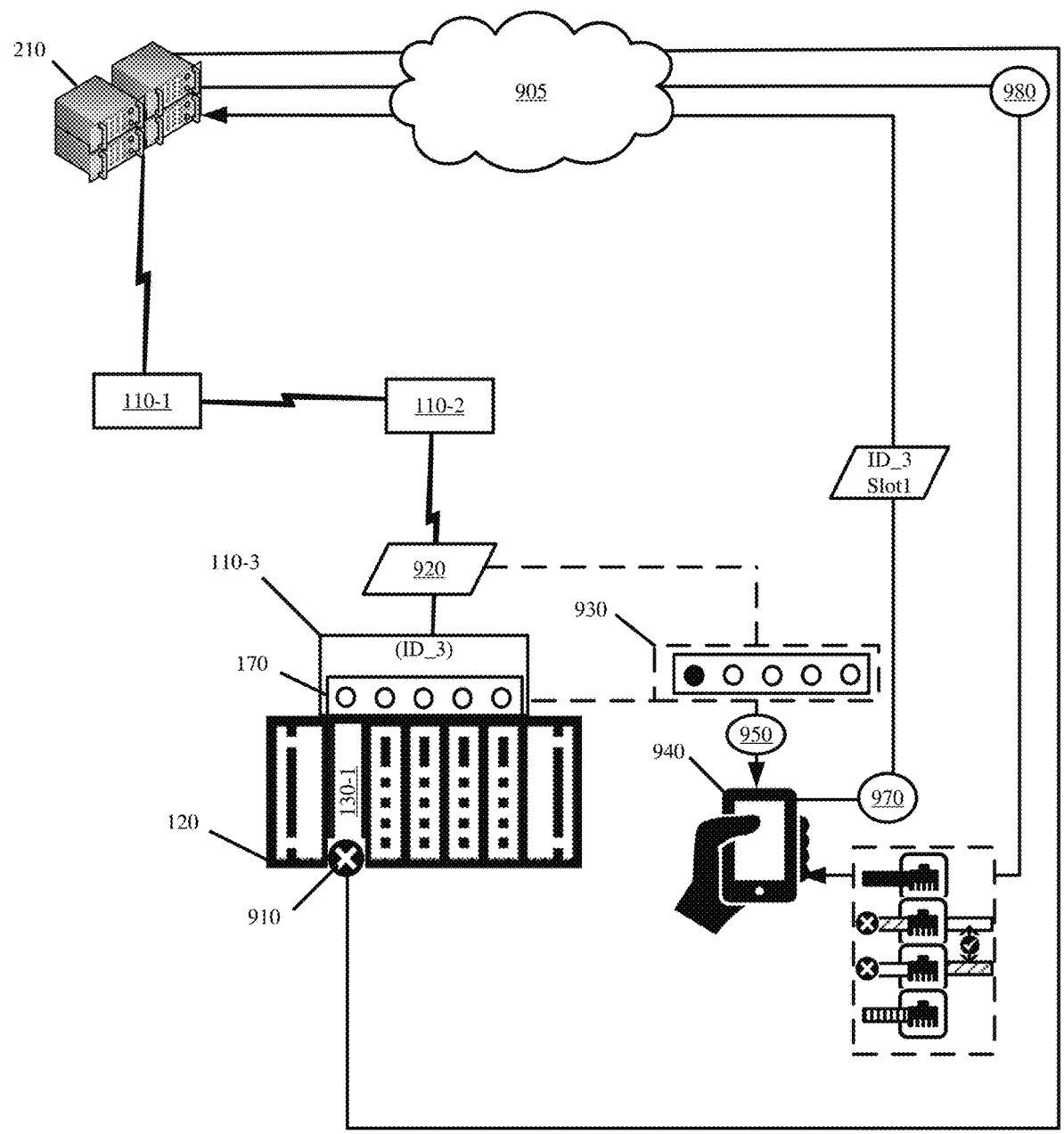
FIG. 9B illustrates an example of initiating remote diagnostic of a particular hardware resource with a user device based on the controlled illumination of the visual indicators in accordance with some embodiments presented herein.

In some embodiments, device 940 may retrieve an error or status message for a particular hardware resource 130 based on identification of that particular hardware resource 130 by a corresponding or aligned visual indicator 170. FIG. 9B illustrates an example of initiating remote diagnostic of hardware resource 130-1 in storage apparatus 120 with device 940 based on the controlled illumination of visual indicators 170 by controller 110-3 in accordance with some embodiments presented herein.

As in FIG. 9A, management device 210 may detect (at 910) a specific error affecting a single hardware resource 130-1 in storage apparatus 120. Management device 210 may detect (at 910) the specific error based on messaging received by management device 210 over data network 905. In some embodiments, data network 905 may provide user devices, remote applications, and/or management device 210 remote access to hardware resources 130. Data network 905 may include a wired and/or wireless IP network. For instance, data network 905 may include wired network connections that connect each storage apparatus 120 in a site to management device 210, and a wireless network (e.g., WiFi, 4G Long Term Evolution ("LTE"), or 5G wireless network) for alternatively accessing management device 210. In any case, data network 905 is a different network than RF mesh network 205 that management device 210 uses to detect and communicate with controllers 110 and that controllers 110 use to communicate with one another.

Management device 210 may log the detected (at 910) error. Management device 210 may notify controller 110-3 of storage apparatus 120 of the issue affecting hardware resource 130-1 by passing control message 920 over RF mesh network 205. Management device 210 may address control message 920 to controller 110-3 by including the unique identifier of controller 110-3 in control message 920, may identify the first slot as the location of hardware resource 130-1 in storage apparatus, and may include the first slot identifier and the detected error condition in control message 920.

In response to receiving control message 920, controller 110-3 may illuminate (at 930) one or more of visual indicators 170 to identify the detected issue with hardware resource 130-1. As noted above, control message 920 may identify the slot in which hardware resource 130-1 is located (e.g., the first slot), and controller 110-3 may illuminate the particular visual indicator from visual indicators 170, that is aligned with the identified slot and/or hardware resource 130-1, with a particular color (e.g., red) to indicate the error or status condition.

A user may be dispatched to locate and/or troubleshoot the detected issue with hardware resource 130-1. The illumination of the particular visual indicator may assist the user in locating hardware resource 130-1. Once before storage apparatus 120, the user may use device 940 to submit (at 970) a query to management device 210 via data network 905.

The query may include the unique identifier for controller 110-3, and/or the slot identifier for the first slot that is aligned with the particular visual indicator that is illuminated with the particular color, and that corresponds to the slot in which the affected hardware resource 130-1 is located. Device 940 may obtain the unique identifier from scanning a barcode, Quick Response code, value, or other identifier on storage apparatus 120. Alternatively, device 940 may obtain the unique identifier via a geolocation or mapping service that determines the current location of device 940, maps the current location to a generated map of the site, determines, from the mapping, that the current location matches to a location of storage apparatus 120 with controller 110-3, and obtains the unique identifier for storage apparatus 120 and/or controller 110-3 from the mapping.

In response to the query, management device 210 may determine that the provided unique identifier for controller 110-3 and the first slot identifier specify a query for hardware resource 130-1. Management device 210 may perform a database lookup to retrieve any logged status and/or other information for hardware resource 130-1. In this example, management device 210 may determine that the earlier detect (at 910) error condition is associated with hardware resource 130-1, may obtain additional information for correcting the error condition, and may provide (at 980), via data network 905, the error condition and/or additional information to device 940 for display to the user. The user may then perform the necessary repairs and/or other tasks to return hardware resource 130-1 to a working state.

The ability of management device 210 and/or controller 110 to collectively control two or more visual indicators 170 further facilitates troubleshooting by assisting a user in quickly locating a particular hardware resource 130 amongst hundreds or thousands of hardware resources 130. For instance, a data center may have hundreds of storage apparatus 120 arranged in rows and/or columns, and each storage apparatus 120 may house tens of hardware resources 130.

In prior art implementations where the visual indicators are independently operated and each visual indicator conveys the status of only a single hardware resource, it is exceedingly difficult for a user to locate a single flashing visual indicator (e.g., flashing a first color for a failing hardware resource) in a data center with thousands of flashing visual indicators (e.g., flashing at least a different second color). However, management device 210 in conjunction with one or more controllers 110 may assist the user in locating a particular hardware resource 130. For instance, a particular controller 110, that is located at a storage apparatus 120 housing a hardware resource 130 of interest, may first flash all visual indicators 170 a color or pattern that is different than the colors or patterns being flashed by visual indicators 170 of other controllers 110 located at other storage apparatus 120. Next, the particular controller 110 may flash only the visual indicator 170 that is aligned with the particular hardware resource 130 and may turn off all other visual indicators 170. Alternatively, the particular controller 110 may flash the visual indicator 170, that is aligned with the particular hardware resource 130, a color, intensity, sequence, or other variation that is different than other visual indicators 170.

Figure 10:
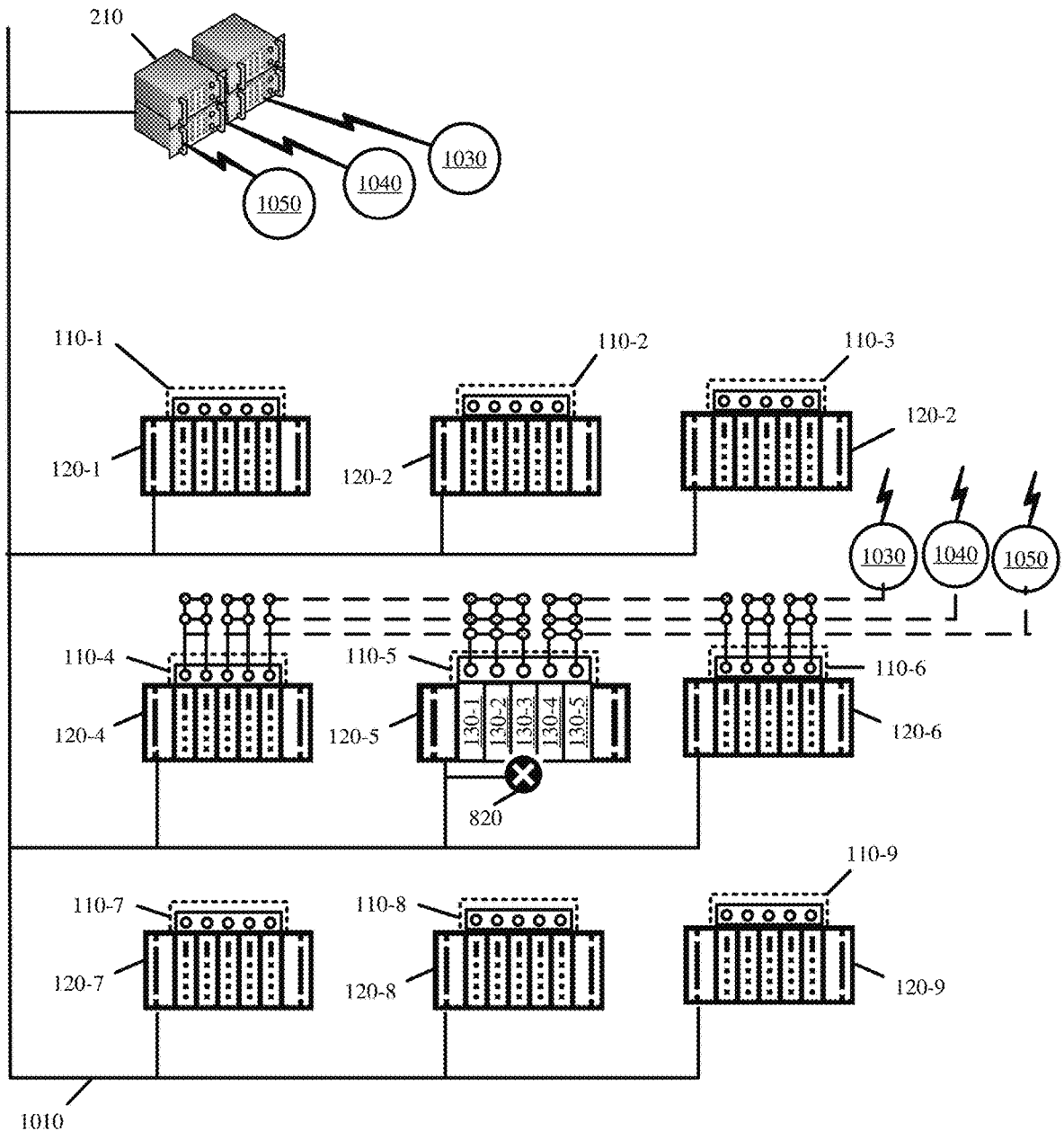
FIG. 10 illustrates an example of collectively controlling visual indicators of different controllers via the RF mesh network to locate a particular hardware resource in accordance with some embodiments presented herein.

FIG. 10 illustrates an example of collectively controlling visual indicators 170 of different controllers 110 via RF mesh network 205 to identify a particular hardware resource 130-1 in accordance with some embodiments presented herein. As shown in FIG. 10, management device 210 may issue commands to hardware resources 130 running in different storage apparatus 120 via data network 1010, may monitor status of hardware resources 130 based on messaging passing across data network 1010, and may detect (at 1020) a failure affecting hardware resource 130-3 in storage apparatus 120-5. Data network 1010 may correspond to a wired or wireless network. For instance, data network 1010 may include a wired broadband Local Area Network ("LAN") or a wireless WiFi network.

To assist a user in locating hardware resource 130-3 in storage apparatus 120-5, management device 210 may issue (at 1030) at least a first message to controllers 110-4, 110-5, and 110-6 in a particular row of storage apparatus 120 where hardware resource 130-3 is located. Upon receiving (at 1030) the first message, controllers 110-4, 110-5, and 110-6 may illuminate all visual indicators 170 a uniform first color for 2 seconds to direct the user to the correct row of storage apparatus 120.

Management device 210 may issue (at 1040) at least a second message to controllers 110-4, 110-5, and 110-6 in the particular row. In response to receiving (at 1040) the second message, controllers 110-4 and 110-6 for storage apparatus 120-4 and 120-6 in the particular row that do not host failing hardware resource 130-3 may turn off all visual indicators 170 for 2 seconds, and controller 110-5 for storage apparatus 120-5 with failing hardware resource 130-3 may illuminate all visual indicators 170 for 2 seconds to direct the user to that particular storage apparatus 120-5 where failing hardware resource 130-5 is found.

Management device 210 may issue (at 1050) at least a third message to controller 110-5 of storage apparatus 120-5 hosting failing hardware resource 130-3. In response to receiving (at 1050) the third message, controller 110-5 may illuminate only the visual indicator 170 for failing hardware resource 130-3 for 2 second and may turn off other visual indicators 170 to direct the user to that failing hardware resource 130-3 on storage apparatus 120-5.

Management device 210 may repeat issuing (at 1030, 1040, and 1050) the first, second, and third messages in order at 2 second intervals until the failure is corrected, hardware resource 130-3 provides an updated status, or the user provides input that hardware resource 130-3 has been located. Thereafter, management device 210 may provide control messages that update the status for all hardware resources 130 in the data center.

In some embodiments, the flashing of visual indicators 170 may be used to generate a sequence of messages or messages with complex data. For instance, a single visual indicator 170 may provide 1 byte or 8 bits of data by illuminating to 1 of 8 colors, and a strip of 24 visual indicators 170 controlled by a single controller 110 may provide 24 bytes of data with a single illumination and 144 bytes of data by producing 6 different illuminations of the strip of visual indicators 170. Accordingly, visual indicators 170 may convey status of different hardware resources 130 or different complex messages for diagnosing, troubleshooting, correcting issues that may affect the data network, a storage apparatus 120, or one or more hardware resources 130 in that storage apparatus 120.

In some embodiments, RF mesh network 205 may be used to provide configuration updates to controllers 110. For instance, the messages generated by management device 210 may include firmware updates for a subset of controllers 110.

In some embodiments, RF mesh network 205 may be used as an alternative network with which to monitor and/or update a storage apparatus 120 and/or hardware resources 130 installed in that a storage apparatus 120. Ordinarily, storage apparatus 120 and hardware resources 130 are accessible via the data network. However, the data network may experience a failure or a storage apparatus 120 or hardware resource 130 may be inaccessible because of a data network misconfiguration (e.g., incorrect address). In some such embodiments, controller 110 on a particular storage apparatus 120 may have an interface to the firmware, configuration, and/or controller of that particular storage apparatus 120 and/or hardware resources 130 installed in that particular storage apparatus 120. Management device 210 may generate and provide storage apparatus 120 updates and/or hardware resource 130 updates to the controller 110 via RF mesh network 205. Controller 110 may receive the updates, may determine that the updates are for the particular storage apparatus 120 and/or hardware resources 130, and may provide the updates to those devices via the interface.

Management device 210 may provide a user interface ("UI") with which different storage apparatus and/or different sets of hardware resources can be placed in a group. Users can then perform batch updates of storage apparatus 120 or hardware resources 130 by issuing the update to the group rather than each storage apparatus 120 or hardware resource 130.

Figure 11:
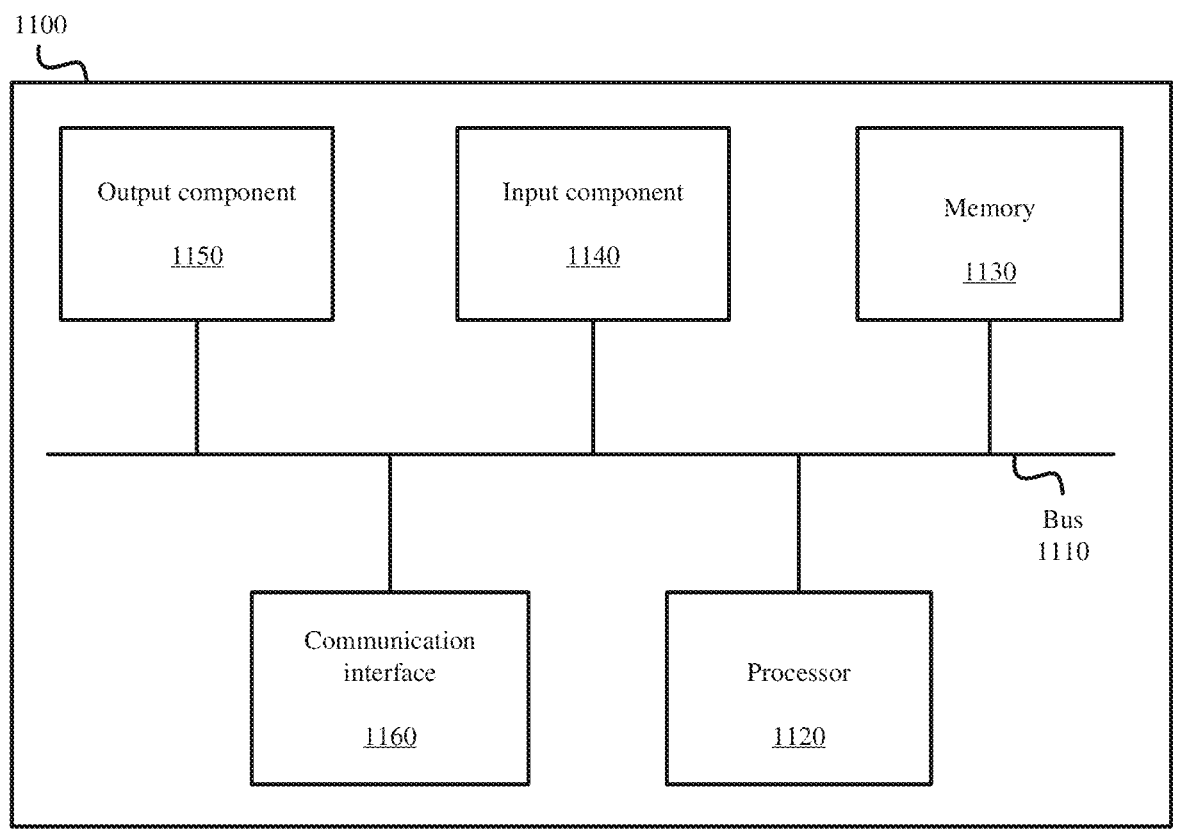
FIG. 11 illustrates example components of one or more devices, according to one or more embodiments described herein.

FIG. 11 is a diagram of example components of device 1100. Device 1100 may be used to implement one or more of the devices or systems described above (e.g., controller 110, storage apparatus 120, hardware resources 130, user device 940, etc.). Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc.

In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
broadcasting, using radio frequency ("RF") signaling, a unique identifier from each of a plurality of controllers operating as part of a distributed plurality of storage apparatus, each controller of the plurality of controllers comprising a plurality of visual indicators;
mapping a physical position of the plurality of controllers based on one or more of a different time or order with which each controller receives the unique identifier of another controller;
monitoring a data network that is used to access a plurality of hardware resources installed in a particular storage apparatus;
determining status of the plurality of hardware resources based on said monitoring; and
controlling the plurality of visual indicators of a particular controller, that is operating as part of the particular storage apparatus, by broadcasting, using the RF signaling, one or more control messages with the unique identifier of the particular controller, wherein said controlling comprises changing each visual indicator of the plurality of visual indicators of the particular controller to convey the status of a different hardware resource of the plurality of hardware resources based on a mapping of each hardware resource to a different visual indicator in the one or more control messages.

2. The method of claim 1 further comprising:
measuring latency with which each controller receives the unique identifier of another controller; and
wherein said mapping comprises:
determining the physical position of the plurality of storage apparatus based on the latency with which two different controllers receive a same unique identifier.

3. The method of claim 1 further comprising:
discovering a first set of the plurality of controllers that are direct neighbors of the particular controller based on the particular controller receiving the unique identifier of each controller in the first set of controllers within a threshold amount of time the unique identifier is broadcast; and
discovering a second set of the plurality of controllers that are at least one controller removed from the particular controller based on the particular controller receiving the unique identifier of each controller in the second set of controllers after a threshold amount of time the unique identifier is broadcast.

4. The method of claim 1 further comprising:
creating an RF mesh network based on said broadcasting, wherein the RF mesh network comprises a plurality of micro-networks that are established between different pairs of the plurality of controllers that are in RF signaling range of one another; and
wherein said broadcasting comprises:
receiving the unique identifier of a first controller with a timestamp at a second controller that is in RF signaling range of the first controller; and
broadcasting the unique identifier of the first controller with the timestamp from the second controller to a third controller that is in RF signaling range of the second controller and outside RF signaling range of the first controller.

5. The method of claim 4, wherein said mapping comprises:
computing a first latency based on the timestamp and a first time the second controller receives the unique identifier of the first controller from the first controller;
computing a second latency based on the timestamp and a later second time the third controller receives the unique identifier of the first controller from the second controller; and
determining relative positioning of a first storage apparatus with the first controller, a second storage apparatus with the second controller, and a third storage apparatus with the third controller based on the first latency and the second latency.

6. The method of claim 1, wherein changing each visual indicator of the plurality of visual indicators comprises:
illuminating a first visual indicator from the plurality of visual indicators of the particular controller with a first color corresponding to a first status of a first hardware resource; and
illuminating a second visual indicator from the plurality of visual indicators of the particular controller with a different second color corresponding to a different second status of a second hardware resource.

7. The method of claim 1 further comprising:
obtaining a position of each of the plurality of hardware resources in the particular storage apparatus;
determining an alignment of the plurality of visual indicators of the particular controller with the plurality of hardware resources based on the position of each of the plurality of hardware resources; and assigning a different visual indicator from the plurality of visual indicators of the particular controller to convey status of a different hardware resource of the plurality of hardware resources based on said alignment.

8. The method of claim 1, wherein determining the status comprises:
detecting an issue impacting a particular hardware resource of the plurality of hardware resources;
broadcasting a particular message comprising the unique identifier of the particular controller, and an encoding of the issue as an illumination of two or more of the plurality of visual indicators of the particular controller; and
presenting the issue impacting the particular hardware resource by changing illumination of the two or more visual indicators according to the particular message, wherein at least one of the two or more visual indicators is interchangeably used to convey status of a hardware resource other than the particular hardware resource.

9. The method of claim 1, wherein determining the status comprises:
detecting that the particular storage apparatus is inaccessible via the data network;
broadcasting a particular message comprising the unique identifier and status of the particular storage apparatus as an illumination of one or more of the plurality of visual indicators of the particular controller; and
changing illumination of the one or more visual indicators of the particular controller, that is operating as part of the particular storage apparatus, according to the particular message while the particular storage apparatus remains inaccessible.

10. The method of claim 1, wherein broadcasting the one or more control messages comprises:
receiving the one or more control messages at a second controller that is different than the particular controller;
determining that the unique identifier of the particular controller in the one or more control messages does not match to the unique identifier of the second controller; and
forwarding the one or more control messages from the second controller to a set of the plurality of controllers that are in RF signaling range of the second controller, and wherein the particular controller is in the set of controllers.

11. The method of claim 1, wherein broadcasting the unique identifier comprises:
receiving the unique identifier of a first controller at the particular controller; and
broadcasting the unique identifier of the particular controller with the unique identifier of the first controller provided as a neighboring controller of the particular controller.

12. The method of claim 11, wherein mapping the physical position comprises:
receiving the unique identifier of the first controller and the unique identifier of a second controller after said receiving of the unique identifier of the first controller; and
determining that the second controller is a neighbor of the first controller, that the first controller is a neighbor of the particular controller, and that the particular controller is not a neighbor of the second controller based on an order of receiving the unique identifier of the first controller and the second controller at the particular controller.

13. The method of claim 1 further comprising:
receiving a configuration comprising a position of each of the plurality of storage apparatus in a site; and
determining that the particular controller operates as part of the particular storage apparatus by matching the physical position of the particular controller to the position of the particular storage apparatus in the configuration.

14. The method of claim 1 further comprising:
detecting an issue at the particular storage apparatus;
determining a set of the plurality of storage apparatus that are located along a path to the particular storage apparatus; and
illuminating the path to the particular storage apparatus by changing the plurality of visual indicators of each controller that operates as part of one of the set of storage apparatus.

15. A device comprising:
one or more processors configured to:
map a physical position of a plurality of controllers, that operate as part of a distributed plurality of storage apparatus, based on one or more of a different time or order with which each controller receives a unique identifier of another controller;
monitor a data network that is used to access a plurality of hardware resources installed in a particular storage apparatus;
determine status of the plurality of hardware resources based on said monitoring; and
control a plurality of visual indicators of a particular controller, that is operating as part of the particular storage apparatus, by broadcasting, using RF signaling, one or more control messages with the unique identifier of the particular controller, wherein said controlling comprises changing each visual indicator of the plurality of visual indicators of the particular controller to convey the status of a different hardware resource of the plurality of hardware resources based on a mapping of each hardware resource to a different visual indicator in the one or more control messages.

16. A system comprising:
a plurality of storage apparatus distributed across a site;
a plurality of hardware resources that execute from different positions within a particular storage apparatus of the plurality of storage apparatus;
a plurality of controllers operating as part of the plurality of storage apparatus, each controller of the plurality of controllers broadcasting a unique identifier to other controllers that are in radio frequency ("RF") signaling range of that controller, each controller comprising a plurality of visual indicators; and
a management device comprising one or more processors configured to:
map a physical position of the plurality of controllers based on one or more of a different time or order with which each controller receives a unique identifier of another controller;
monitor a data network that is used to access the plurality of hardware resources;
determine status of the plurality of hardware resources based on said monitoring; and
control the plurality of visual indicators of a particular controller, that is operating as part of the particular storage apparatus, by broadcasting, using RF signaling, one or more control messages with the unique identifier of the particular controller, wherein said controlling comprises changing each visual indicator of the plurality of visual indicators of the particular controller to convey the status of a different hardware resource of the plurality of hardware resources based on a mapping of each hardware resource to a different visual indicator in the one or more control messages.

* * * * *